United States Patent
Zhang et al.

(10) Patent No.: US 9,664,846 B2
(45) Date of Patent: May 30, 2017

(54) BACKLIGHT MODULE AND DISPLAY DEVICE

(71) Applicants: BOE Technology Group Co., Ltd., Beijing (CN); Beijing BOE Display Technology Co., Ltd., Beijing (CN)

(72) Inventors: Minghui Zhang, Beijing (CN); Dongxi Li, Beijing (CN); Hui Zheng, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/785,821

(22) PCT Filed: May 14, 2015

(86) PCT No.: PCT/CN2015/078998
§ 371 (c)(1),
(2) Date: Oct. 20, 2015

(87) PCT Pub. No.: WO2016/041369
PCT Pub. Date: Mar. 24, 2016

(65) Prior Publication Data
US 2016/0259123 A1    Sep. 8, 2016

(30) Foreign Application Priority Data

Sep. 19, 2014    (CN) .......................... 2014 1 0483937

(51) Int. Cl.
*F21V 8/00*    (2006.01)
(52) U.S. Cl.
CPC .................... *G02B 6/0088* (2013.01)
(58) Field of Classification Search
CPC ................. F21S 8/00; G02B 6/0088
(Continued)

(56) References Cited

U.S. PATENT DOCUMENTS 6,419,369 B1 *    7/2002  Itoh ...................... G02B 6/0031
                                                          362/23.15
7,095,461 B2 *    8/2006  Kim .................. G02F 1/133308
                                                          349/58
(Continued)

FOREIGN PATENT DOCUMENTS

CN        101334547 A       12/2008
CN        102691936 A        9/2012
(Continued)

OTHER PUBLICATIONS

Mar. 30, 2016—(CN)—Second Office Action Appn 201410483937.9 with English Tran.
(Continued)

*Primary Examiner* — Laura Tso
(74) *Attorney, Agent, or Firm* — Banner & Witcoff, Ltd.

(57) ABSTRACT

A backlight module and a display device are provided. The backlight module includes a back plate, a light emitting component located on the back plate and a module frame located around periphery of the back plate. The module frame includes a main body section and a wedge shaped section on the side of main body section close to light emitting component. The inclined surface of the wedge shaped section faces the light exit surface of the light emitting component and the angle formed there between is an acute angle. The backlight module and the display device mainly utilize the design of the module frame with a wedge shaped section to facilitate the outgoing of the light rays emitted by the backlight source around its periphery in a narrow bezel design, solving the problem of peripheral pixels disappearing from side view.

16 Claims, 4 Drawing Sheets

(58) Field of Classification Search
USPC .................................... 362/97.1, 633, 634
See application file for complete search history.

(56) References Cited

U.S. PATENT DOCUMENTS

| | | | | |
|---|---|---|---|---|
| 8,905,615 B2* | 12/2014 | Chen | ................ | G02F 1/133308 362/600 |
| 2011/0235366 A1* | 9/2011 | Hisada | .............. | G02F 1/133608 362/633 |
| 2012/0262907 A1* | 10/2012 | Lee | ........................ | H05K 5/02 362/97.1 |
| 2013/0050820 A1* | 2/2013 | Shin | ..................... | G06F 1/1601 359/465 |
| 2013/0155654 A1* | 6/2013 | Lin | .................. | G02F 1/133308 362/97.1 |
| 2013/0335670 A1* | 12/2013 | Huang | .................... | H05K 5/03 349/58 |
| 2014/0247398 A1* | 9/2014 | Kakimoto | ........... | G02B 6/0055 348/729 |
| 2014/0347598 A1* | 11/2014 | Chen | .................... | G02F 1/1336 349/61 |
| 2015/0062969 A1* | 3/2015 | Chen | ................... | G02B 6/0093 362/633 |
| 2015/0092448 A1* | 4/2015 | Oh | ....................... | G06F 1/1601 362/633 |

FOREIGN PATENT DOCUMENTS

| | | |
|---|---|---|
| CN | 103148416 A | 6/2013 |
| CN | 103185255 A | 7/2013 |
| CN | 103676321 A | 3/2014 |
| CN | 104235695 A | 12/2014 |
| JP | 2005148372 A | 6/2005 |

OTHER PUBLICATIONS

Aug. 3, 2015—International Search Report and Written Opinion Appn PCT/CN2015/078998 with English Tran.
Nov. 4, 2015—First Office Action Appn 201410483937.9 with English Tran.

* cited by examiner

BACKLIGHT MODULE AND DISPLAY DEVICE

The application is a U.S. National Phase Entry of International Application No. PCT/CN2015/078998 filed on May 14, 2015, designating the United States of America and claiming priority to Chinese Patent Application No. 201410483937.9 filed on Sep. 19, 2014. The present application claims priority to and the benefit of the above-identified applications and the above-identified applications are incorporated by reference herein in their entirety.

TECHNICAL FIELD

Embodiments of the present invention relate to a backlight module and a display device.

BACKGROUND

In a liquid crystal display device, the backlight module is one of the most important components, and it is mainly used to provide sufficient brightness and an evenly distributed light source to enable the liquid crystal panel to display images normally. A backlight module consists mainly of light-emitting elements, a reflecting sheet, a light guiding plate, an optical diaphragm, a module frame, a back plate, etc., wherein the module frame is used to connect or position other components of the backlight module and provide some degree of support and fixation.

However, in the narrow bezel design (means that the width of the module bezel is less than that in the design of a traditional product) that is becoming popular nowadays, the module frame (also known as adhesive frame) generally includes a separating pad between the display panel and the optical diaphragm to support the display panel and secure the optical diaphragm.

Figure 1:
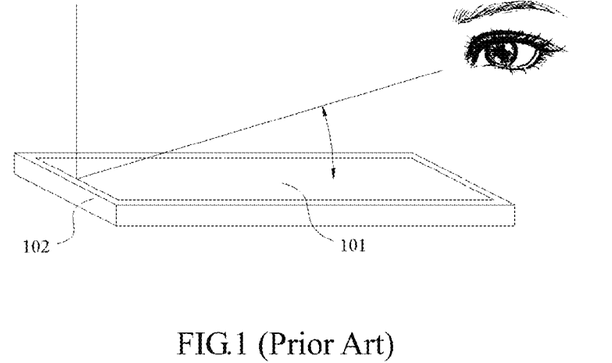
FIG. 1 is a schematic diagram of a display panel being viewed from its side.
Figure 2:
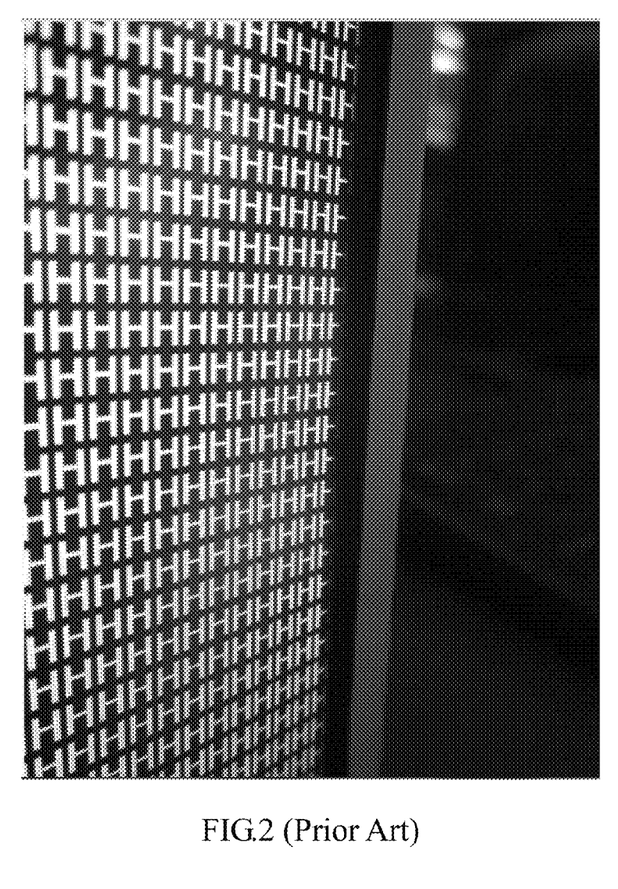
FIG. 2 is a schematic diagram illustrating the phenomenon of peripheral pixels disappearing from side view.

However, light emitted from the backlight source would be hindered by the placement of the separating pad, resulting in the problem of the peripheral pixels disappearing when the display panel is being viewed from its side as shown in FIG. 1 for example. To illustrate the disappearance of the peripheral pixels, FIG. 2 shows that only half "Hs" on the rightmost side can be seen.

SUMMARY

Embodiments of the present invention provide a backlight module and a display device.

Embodiments of the present invention provide a backlight module, which includes a back plate, a light emitting component located on the back plate and a module frame located around the periphery of the back plate, wherein the module frame comprising a main body section and a wedge shaped section on the side of the main body section close to the light emitting component, the inclined surface of the wedge shaped section faces the light exit surface of the light emitting component, the angle formed by the inclined surface of the wedge shaped section and the light exit surface of the light emitting component is an acute angle, and the inclined surface of the wedge shaped section has a notch disposed therein to engage with the light emitting component.

Embodiments of the present invention further provide a display device, which includes any of the backlight modules provided in embodiments of the present invention.

BRIEF DESCRIPTION OF THE DRAWINGS

In order to clearly illustrate the technical solutions of embodiments of the present invention, the drawings for the embodiments will be briefly described in the following; it is obvious that the described drawings are only related to some embodiments of the present invention and thus are not limitative of the invention.

DETAILED DESCRIPTION

In order to make objects, technical details and advantages of the embodiments of the present invention apparent, the technical solutions of the embodiments will be described in a clearly and fully understandable way in connection with the drawings related to the embodiments of the present invention. Apparently, the described embodiments are just a part but not all of the embodiments of the invention. Based on the embodiments described herein, those skilled in the art can obtain other embodiment(s), without any creative work, which fall within the scope of the invention.

It is to be noted that, in the description of embodiments of the present invention, relationships in orientation or position indicated by terms "upper", "lower", etc. are those based on the indication in the accompanying drawings; they are used only for the purpose of describing embodiments of the present invention and simplifying the description and not intended to indicate or imply that the devices or elements involved must be in, be configured with or operate with particular orientation or position; therefore they are by no means to be understood as limits to the present invention. Unless otherwise stated and defined, terms "mount", "connected with" and "connect" should be interpreted broadly. For example, they can mean a fixed connection, or a detachable connection, or an integral connection; they can mean a mechanical connection, or an electrical connection; they can mean a direct connection, or an indirect connection via an intermediate media, or inside communication of two elements. For those of ordinary skills in the art, meanings of the above-mentioned terms in the present disclosure may be understood depending on specific circumstances.

In order to clearly illustrate embodiments of the present invention, the phenomenon of peripheral pixels disappearing from side view will first be fully explained with respect to a structure of a backlight module for example.

FIG. 1 is a schematic diagram of a display panel being viewed from its side at a certain angle. At this point, as shown in FIG. 1, light rays emitted by the peripheral pixels close to the bezel (also referred as module bezel) 102 of the display device should exit obliquely and enter human eyes so that the image displayed by the whole display panel 101 should be seen by the human eyes. However, in a conventionally designed backlight module, especially in a backlight module designed with a narrow bezel, the problem of peripheral pixels disappearing when the display panel is viewed from its side will arise as shown FIG. 2. This problem arises mainly because the module frame in the backlight module is configured with a separating pad to support the display panel and secure the optical diaphragm, whereas the separating pad would hinder the light rays emitted by the backlight source.

Figure 3:
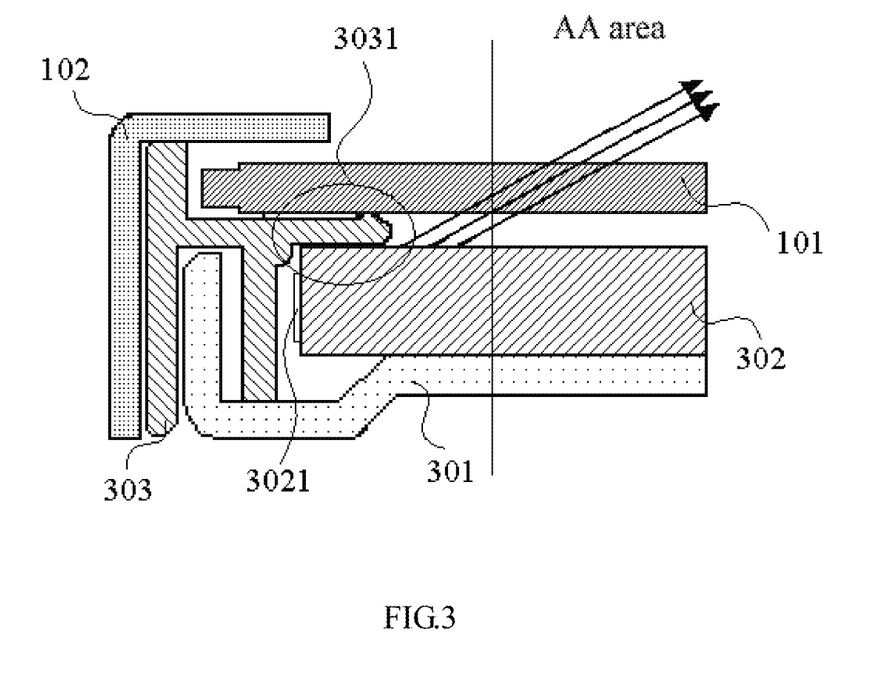
FIG. 3 is a schematic diagram illustrating the structure of a backlight module installed in a display device.

For example, FIG. 3 shows a structure diagram of a backlight module installed in a display device. As shown in this figure, the backlight module includes a back plate 301, a light emitting component 302 and a module frame 303, wherein the light emitting component 302 is located on the back plate 301 to provide backlight for the display panel 101, and it may include light emitting elements 3021, a light guiding plate, a reflecting sheet, an optical diaphragm and the like; the module frame 303 is located around the periphery of the back plate 301 to connect or position other components in the backlight module and to provide some degree of support and fixation. In the structure of this backlight module, the display panel 101 is installed over the backlight module and supported by the separating pad section 3031 of the module frame 303. The bezel 102 of the display device is installed around the periphery of the display panel 101 and the back plate 301, and mainly used to provide support and protection. When the display panel 101 is being viewed from its front, light is emitted upward from the light emitting component 302 by, for example, powering the light emitting elements 3021 such as light emitting diodes therein, and the light is sufficient to illuminate the whole display area (AA area) of the display panel 101 and thus provide back lighting for the display panel 101. However, when the display panel 101 is being viewed from its side, it can be seen from FIG. 3 that some of the light emitted by the light emitting component 302 are blocked by the separating pad section 3031, so that a part of the display area (the AA area) of the display panel 101 has no oblique light rays passing there through. Because of the absence of back lighting, pixels in this part of area, i.e. those in the peripheral part of the display area can not display normally in case of side view, resulting in the phenomenon that the peripheral pixels disappear in case of side view.

Embodiments of the present invention provide a backlight module. See FIG. 4 for the structure of the backlight module installed in a display device. The backlight module includes a back plate 401, a light emitting component 402 located on the back plate 401 and a module frame 403 located around the periphery of the back plate 401. The module frame 403 includes a main body section 4031 and a wedge shaped section 4032 on the side of the main body section 4031 close to the light emitting component 402. The inclined surface 40321 of the wedge shaped section 4032 face and form an acute angle with the light exit surface 4022 of the light emitting component 402. Moreover, in order to secure the module frame 403, a notch 40322 may be disposed in the inclined surface of the wedge shaped section 4032 to engage with the light emitting component 402.

Figure 4:
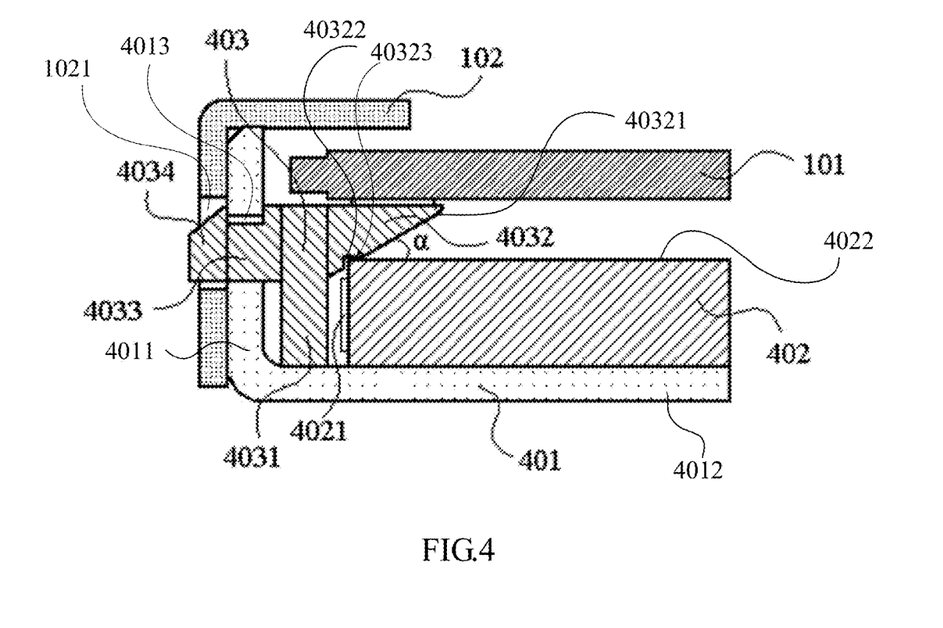
FIG. 4 is a schematic diagram illustrating the structure of a backlight module installed in a display device according to an embodiment of the present invention.

The light emitting component 402 is used to provide back lighting for the display panel 101, and it may include light emitting elements 4021, a light guiding plate, a reflecting sheet, an optical diaphragm, etc. Conventional designs can be referred to for its structure and constitution, which will not be detailed here. As shown in FIG. 4, the module frame 403 further includes an engaging groove section 4033 and an outlaid section 4034. This is only an example design to fix the module frame to the back plate, which will be detailed hereafter. Of course, the fixation of the module frame to the back plate may be achieved by the "h" shaped frame structure shown in FIG. 3, by engaging protrusions and depressions disposed on (in) the back plate and the module frame, or by other structures or designs. The present invention is subject to no limitation about this. Moreover, the mark off of the sections of the module frame 403 shown in FIG. 4 is only for illustration, wherein the main body section 4031 is the section used for support, the wedge shaped section 4032 is the section that includes an inclined surface 40321 so as to be wedge shaped, the engaging groove section 4033 is the section that engages with the back plate 401, and the outlaid section 4034 is the section located on the outer side of the back plate 401.

When the backlight module provided by embodiments of the present invention is installed in a display device, the display panel 101 is installed over the backlight module and supported by the wedge shaped section 4032 of the module frame 403. The bezel 102 of the display device is installed around the periphery of the display panel 101 and the back plate 401, and it is mainly used to provide support and protection.

Figure 5:
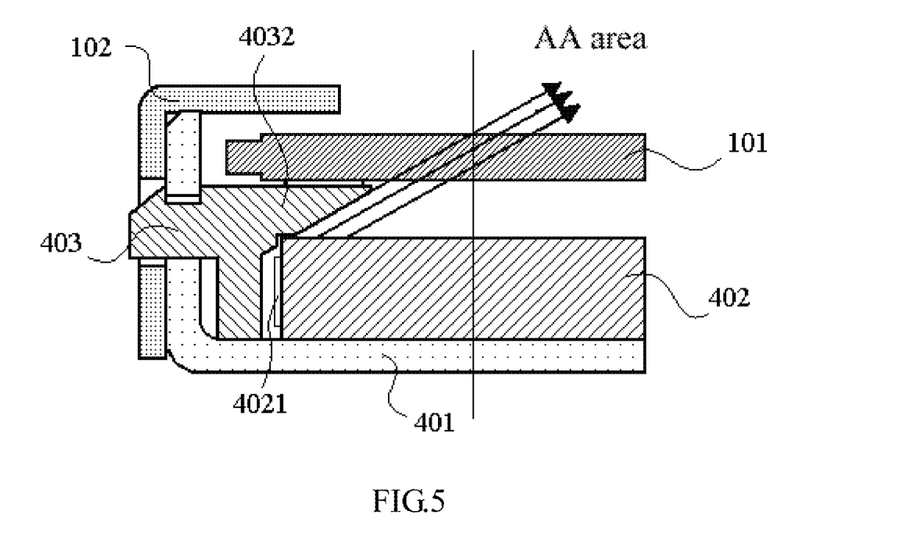
FIG. 5 is a schematic diagram illustrating the back lighting of a display device including the backlight module in an embodiment of the present invention when the display device is in operation.

For example, FIG. 5 shows the back lighting of a display device including the backlight module when the display device is in operation. When the display panel 101 is viewed from its front, light rays are emitted upward from the light emitting component 402 and are enough to cover the whole display area (the AA area) of the display panel 101 to provide back lighting for the display panel 101. When the display panel 101 is viewed from its side, the light rays emitted from the light emitting component 402 are capable of passing through the display panel obliquely without being blocked, since the module frame 403 employs a structure including the wedge shaped section 4032. As a result, all the pixels in the display area (the AA area) are exposed to sufficient back lighting, so that the phenomenon of peripheral pixels disappearing from side view as shown in FIG. 3 is avoided.

Furthermore, the design of the wedge shaped section 4032 still allows the display panel 101 to be supported by the backlight module and enable the optical diaphragm on the surface of the light emitting component 402 to be secured by disposing a notch in the inclined surface to engage with the light emitting component 402.

The backlight module provided by embodiments of the present invention can solve the problem of the peripheral pixels disappearing in case of side view, and at the same time can have a small bezel width so that it is applicable to the display device with a narrow bezel design.

It is to be noted that, the shapes of the respective structures shown in FIG. 4 are only for illustration. Modifications or equivalents can be made to the structures by those skilled in the art, for example the back plate may have a structure, in which the side wall and the base board are separated, or the module frame may be configured with other shapes. Obviously, the modifications or equivalents will not depart from the spirit and scope of embodiments of the present invention, as long as a frame structure with the above-mentioned wedge shaped section 4032 is employed.

Figure 6:
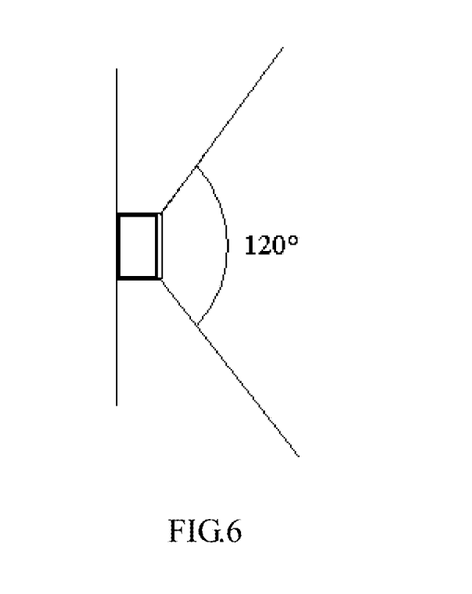
FIG. 6 is a schematic diagram illustrating the valid outgoing angle of the light from light emitting diodes (LEDs)

For example, the angle α formed by the inclined surface of the wedge shaped section 4032 and the light exit surface of the light emitting component 402 is in the range of 10° to 80°, in which the module frame 403 can engage with the light emitting component 402 firmly and at the same time have the light rays for back lighting outgo with advantage, and thus is applicable to display devices with a narrow bezel design. For example, the angle α formed by the inclined surface 40321 of the wedge shaped section and the light exit surface 4022 of the light emitting component 402 is 60°. With reference to the schematic diagram for the valid outgoing angle of the light from light emitting diodes (LEDs), the valid outgoing angle of light is 120° as for LEDs generally employed by backlight modules. Therefore, when the above-mentioned angle α is larger than 60°, the improving effect on the disappearance of the peripheral pixels in case of side view will no longer be significant, because the light rays indicated by the arrow in FIG. 5 will be rather sparse. When the above-mentioned angle α is smaller than 60°, the inclined surface of the wedge shaped section 4032 will be more close to the light exit surface of the light emitting component 402, so that the angle at which the light rays indicated by the arrow in FIG. 5 may outgo would be more close to the surface of the display panel and the angle at which those light rays can be perceived in side view may be smaller correspondingly, deteriorating the improving effect on the disappearance of peripheral pixels in case of side view. For example, when the angle α is 60°, a preferable improving effect on the disappearance of peripheral pixels in case of side view may be obtained.

The above-mentioned notch 40322 in the inclined surface 40321 of the wedge shaped section 4032 contains, for example, a notch surface 40323 parallel with and facing the light exit surface of the light emitting component 402 and the lower notch surface of the structure may bond to the surface of the light emitting component 402 firmly, so that the optical diaphragm of the light emitting component 402 may be firmly secured by this notch surface and at the same time is not susceptible to damage. Other surfaces of the above-mentioned notch may be designed depending on the shapes of the edges of the light emitting component 402 to obtain a preferable engaging effect.

Moreover, the surface on the side of wedge shaped section 4032 away from the light emitting component 402 is a plane parallel with the light exit surface of the light emitting component 402, which ensures that the display panel engaged with the wedge shaped section is parallel with the light exit surface of the backlight source, being in favor of improving display brightness and uniformity of brightness.

On the other Hand, with reference to FIG. 4, the above-mentioned back plate 401 includes, for example, a side wall 4011 and a base board 4012, the light emitting component 402 is located on the base board 4012, and the main body section 4031 of the module frame 403 is bonded to the side wall 4011. That is to say, the main body section 4031 of the module frame 403 for support joins to the side wall 4011 of the back plate 401 and goes around the rim of the back plate 401 inside or outside, so that the back plate acts as an integral support for the module frame 403, being in favor of structure compactness and space saving.

Figure 7:
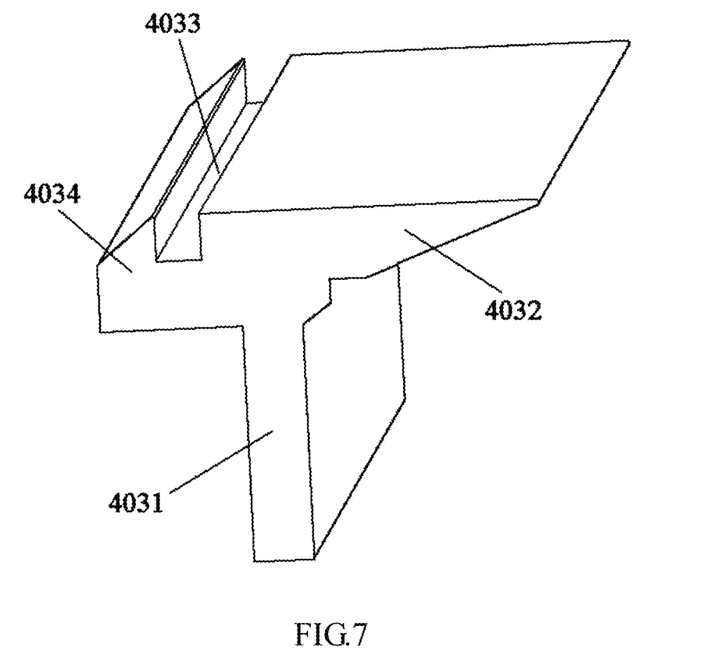
FIG. 7 is a schematic diagram illustrating the three dimensional structure of a module frame of a backlight module according to an embodiment of the present invention.

Based on this, FIG. 7 shows the three dimensional structure including the engaging groove section 4033 and the outlaid section 4034 as described above. Only a segment of the module frame 403 is shown in this figure. In combination with FIG. 4, it can be seen that the module frame 403 has the engaging groove section 4033 located on the outer side of the main body section 4031. Furthermore, a through hole 4013 is disposed in the side wall of the back plate 401 corresponding to the engaging groove section 4033, so that the module frame 403 is fixed to the back plate 401 by locking the engaging groove section 4033 into the through hole 4013. This design lies mainly in that the through hole 4013 and the engaging groove section 4033 are disposed in the back plate 401 and the module frame 403 in such a way that they can engage with each other, so that the back plate 401 and the module frame 403 are secured tightly.

In addition, the module frame 403 may further include an outlaid section 4034 joining to the engaging groove section 4033 and located on the outer side of the side wall 4011 of the back plate 401. The projected area of the outlaid section 4034 on the side wall of the back plate is larger than the area of the above-mentioned through hole 4013. In this design, the outlaid section 4034 can not pass through the through hole 4013 while joining to the engaging groove section 4033 and being located on the outer side of the side wall 4011 of the back plate 401, so that it, in cooperation with the engaging section 4034, can make the whole module frame 403 secured more firmly and thus not prone to sliding.

In accordance with the description above, the mark off of the sections of the module frame 403 shown in FIG. 4 and FIG. 7 is only for illustration, wherein the main body section 4031 is the section used for support, the wedge shaped section 4032 is the section that includes an inclined surface 40321 so as to be wedge shaped, the engaging groove section 4033 is the section that engages with the back plate 401, and the outlaid section 4034 is the section located on the outer side of the back plate 401. Moreover, the above-mentioned structure of the module frame 403 is only an example design to fix the module frame to the back plate. Of course, the fixation of the module frame to the back plate may also be achieved by the "h" shaped frame structure as shown in FIG. 3, by engaging protrusions and depressions disposed on (in) the back plate and the frame, or by other structures or designs. The present invention is subject to no limitation about this.

Figure 8:
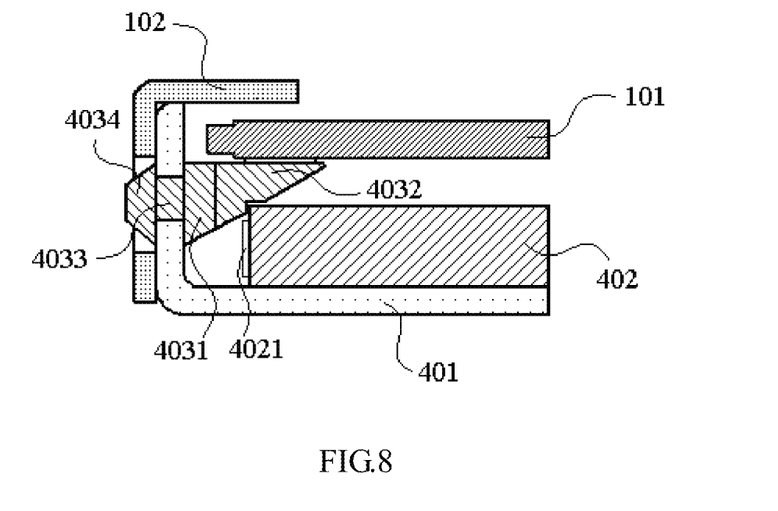
FIG. 8 is a schematic diagram illustrating the structure of a module frame of a backlight module according to an embodiment of the present invention.

For example, FIG. 8 shows a structure of the module frame 403 of a backlight module, wherein the main body section 4031 is integrated with the wedge shaped section 4032 and cooperates with the side wall of the back plate 401, as a result, materials to be used are reduced. Meanwhile, the engaging groove section 4033 fills the whole space of the through hole in the side wall and the outlaid section 4034 is configured with the shape of a trapezoid round cap, so that the back plate 401 and the module frame 403 are bonded together firmly and tightly. Moreover, in contrast to the "h" shaped module frame incorporating the wedge shaped section 4032, the module frame 403 with those structures described above has its center of gravity close to its center, so that it is less likely to rotate. For example, the main body section 4031 and the wedge shaped section 4032 in FIG. 5 are also integrated into one structure.

Based on the above-mentioned backlight modules, embodiments of the present invention provide a display device including any one of the above-mentioned backlight modules.

For example, the display device may be any product or component with display functionality, such as a liquid crystal panel, a cell phone, a watch, a tablet, a television set, a display, a notebook computer, a digital picture frame, a navigator, etc. The display device may have the structure shown in FIG. 4 or FIG. 8. For example, the display device includes a display panel 101, which is adhered to a part of the surface of the module frame 403 away from the light emitting component 402. For example, when the module frame further includes an engaging groove section on the outer side of the main body section and an outlaid section joining to the engaging groove section, the display device may further include a display device bezel 102 outside the back plate and a through hole 1021 is disposed in the display device bezel 102 corresponding to the outlaid section, so that the outlaid section 4034 may be exposed and thus have a larger volume and a higher weight. Since the display device provided in embodiments of the present invention has the same technical features as the backlight modules described above, the same technical problems can be resolved and the same technical effects can be achieved.

In summary, embodiments of the present invention mainly utilize the module frame design incorporating a wedge shaped section, so that the light rays emitted by the light emitting component around the periphery of the backlight module can outgo obliquely at a certain angle, and thus the light emitted by the peripheral pixels can be seen by human eyes from side view, therefore resolving the problem of peripheral pixels disappearing from side view.

Meanwhile, the design of the wedge shaped section can make no change in the support of the backlight module to the display panel, and make the light emitting component and the module frame secured to each other by means of the notch disposed in the inclined surface, i.e. can make the optical diaphragm secured as well.

The backlight modules provided in embodiments of the present invention mainly utilize the design of the module frame with the wedge shaped section to facilitate outgoing of the light rays emitted by the backlight source around its periphery in a narrow bezel design, so that the problem of peripheral pixels disappearing from side view can be resolved and at the same time the bezel can have a small width, making the backlight module applicable to display devices with a narrower bezel design.

It should be explained that, terms "comprise", "include" or any of their derivatives herein are intended to cover non-exclusively, so that when referring to a process, a method, an article or a device comprising or including a series of elements, the process, method, article or device contains not only those stated elements but also may contain other elements not listed expressly or inherent elements thereof. Without any further limitation, when an element is defined by the phrase "comprising one . . . ", "including one . . . " or their derivatives, it is not excluded that additional elements the same as the element exist in the process, method, article or device that comprises or includes the element.

What has been described above is only specific implementation of the present invention, and the scope claimed by the present invention is not limited to this; changes and alternatives may readily occur to those skilled in the art in consideration of the technical disclosure of the present invention, which fall within the scope claimed by the present invention. Therefore, the scope claimed by the present invention is only defined by that of the claims.

The present application claims priority of China Patent application No. 201410483937.9 filed on Sep. 19, 2014, the content of which is incorporated in its entirety as part of the present application by reference herein.

The invention claimed is:

1. A backlight module, comprising a back plate, a light emitting component located on the back plate and a module frame located around a periphery of the back plate, wherein the module frame comprises a main body section and a wedge shaped section on a side of the main body section close to the light emitting component, an inclined surface of the wedge shaped section faces a light exit surface of the light emitting component, and an angle formed by the inclined surface of the wedge shaped section and the light exit surface of the light emitting component is an acute angle, and the inclined surface of the wedge shaped section has a notch disposed therein to engage with the light emitting component.

2. The backlight module of claim 1, wherein the angle between the inclined surface of the wedge shaped section and the light exit surface of the light emitting component is between 10° and 80°.

3. The backlight module of claim 2, wherein the angle between the inclined surface of the wedge shaped section and the light exit surface of the light emitting component is 60°.

4. The backlight module of claim 1, wherein the notch has a notch surface parallel with and facing the light exit surface of the light emitting component.

5. The backlight module of claim 1, wherein the surface of the wedge shaped section on a side away from the light emitting component is a plane parallel to the light exit surface of the light emitting component.

6. The backlight module of claim 1, wherein the back plate comprises a side wall and a base board, the light emitting component is located on the base board and the main body section of the module frame is bonded to the side wall.

7. The backlight module of claim 6, wherein the module frame further comprises an engaging groove section on an outer side of the main body section; the side wall of the back plate has a through hole disposed therein corresponding to the engaging groove section; the module frame is fixed to the back plate by locking between the engaging groove section and the through hole.

8. The backlight module of claim 7, wherein the module frame further includes an outlaid section joining to the engaging groove section and located on the outer side of the side wall of the back plate, and the projected area of the outlaid section on the side wall of the back plate is larger than the area of the through hole.

9. A display device, comprising the backlight module of claim 1.

10. The display device of claim 9, wherein the display device comprises a display panel adhered to a part of the surface of the module frame away from the light emitting component.

11. The display device of claim 9, wherein the module frame further comprises an engaging groove section on an outer side of the main body section and an outlaid section joining to the engaging groove section, the display device further comprises a display device bezel around the periphery of the back plate, and a through hole is disposed in the display device bezel corresponding to the outlaid section.

12. The display device of claim 10, wherein the module frame further comprises an engaging groove section on an outer side of the main body section and an outlaid section joining to the engaging groove section, the display device further comprises a display device bezel around the periphery of the back plate, and a through hole is disposed in the display device bezel corresponding to the outlaid section.

13. The backlight module of claim 2, wherein the back plate comprises a side wall and a base board, the light emitting component is located on the base board and the main body section of the module frame is bonded to the side wall.

14. The backlight module of claim 3, wherein the back plate comprises a side wall and a base board, the light emitting component is located on the base board and the main body section of the module frame is bonded to the side wall.

15. The backlight module of claim 4, wherein the back plate comprises a side wall and a base board, the light emitting component is located on the base board and the main body section of the module frame is bonded to the side wall.

16. The backlight module of claim 5, wherein the back plate comprises a side wall and a base board, the light emitting component is located on the base board and the main body section of the module frame is bonded to the side wall.

* * * * *